Nov. 25, 1952   W. L. MORRISON, JR   2,619,606
MAGNETIC POWER UNIT AND ROTOR THEREFOR
Filed April 14, 1950   3 Sheets-Sheet 1
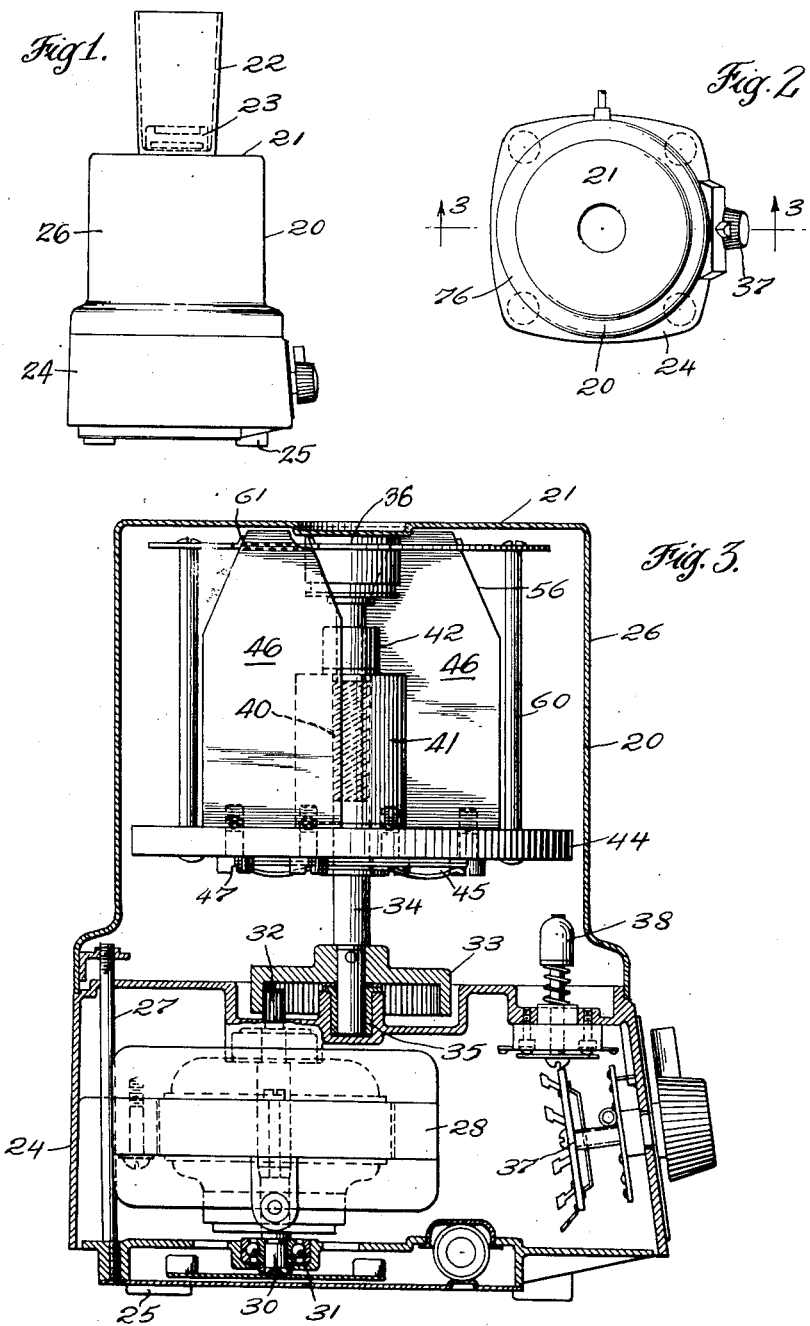
INVENTOR
WILLARD L. MORRISON JR.
BY
ATTORNEYS.

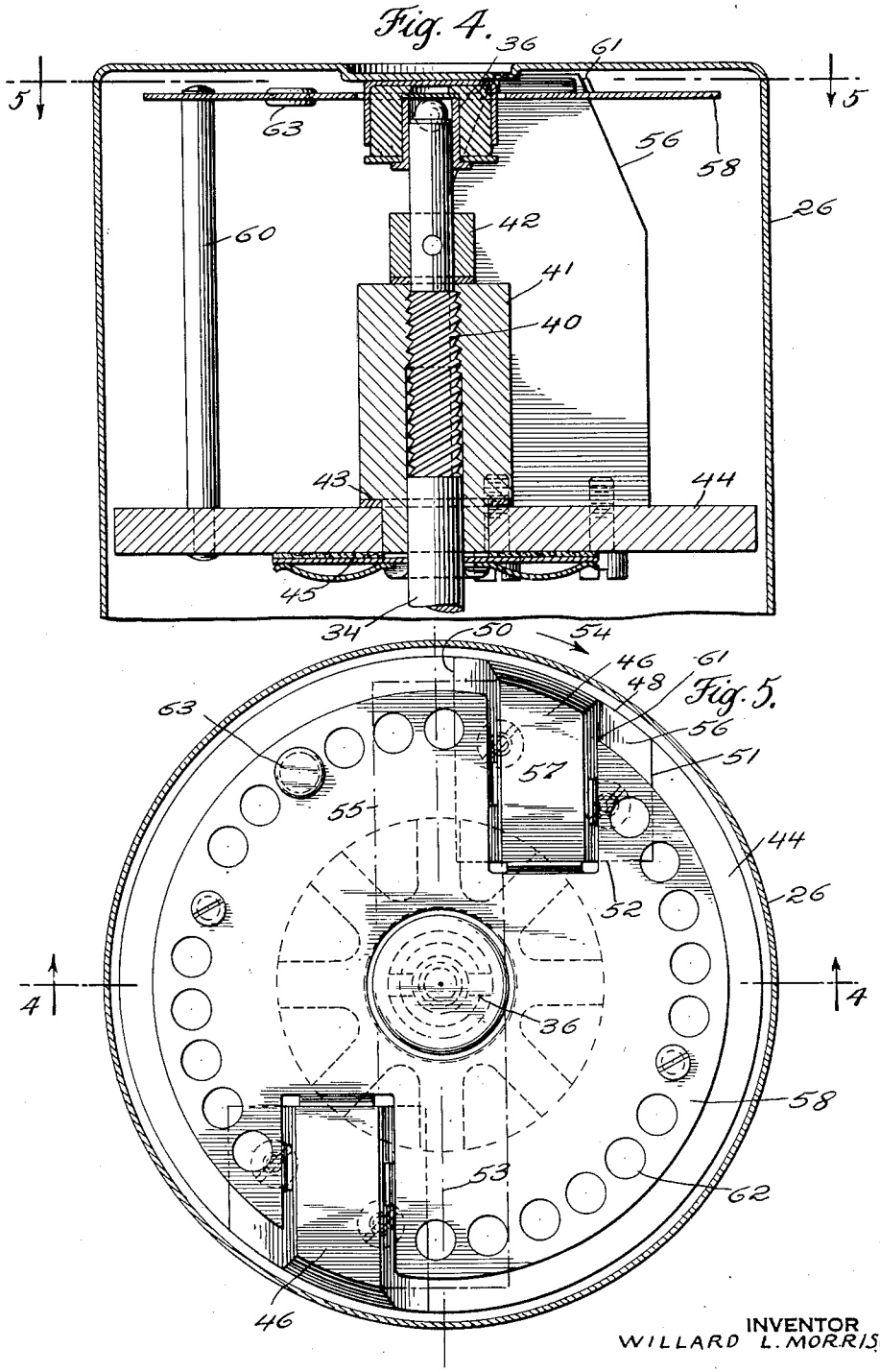

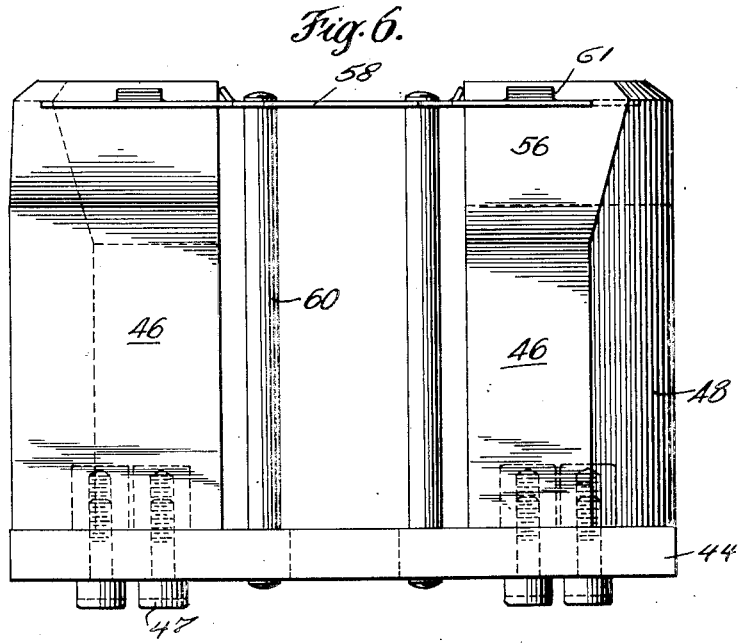

Patented Nov. 25, 1952

2,619,606

UNITED STATES PATENT OFFICE 2,619,606

MAGNETIC POWER UNIT AND ROTOR THEREFOR

Willard L. Morrison, Jr., Lake Forest, Ill., assignor to Magnetic Power, Inc., Wilmington, Del., a corporation of Delaware Application April 14, 1950, Serial No. 156,017

3 Claims. (Cl. 310—103)

The present invention relates to magnetic power units of the type in which turning permanent magnets drive a magnetizable keeper to accomplish some mechanical operation such as mixing, stirring, homogenizing, juicing of fruit, or operation of some piece of equipment.

A purpose of the invention is to economize on the quantity of metal required for the permanent magnets and simplify their design and construction.

A further purpose is to secure a more effective rotating field in the region of the keeper.

A further purpose is to obtain a maximum axially displaced magnetic field from a minimal amount of permanent magnet material.

A further purpose is to reduce the axial height of the rotor.

A further purpose is to facilitate dynamic balancing of the rotor.

A further purpose is to provide a convenient location for dynamically balancing weights at a position where they will be most effective.

Further purposes appear in the specification and in the claims.

In the drawings I have chosen to illustrate one only of the numerous embodiments of the invention, selecting the form shown from the standpoints of convenience in illustration, satisfactory operation and clear demonstration of the principles involved.

Figure 1 is a side elevation of a magnetic power unit employed as a stirrer and embodying the principles of the invention.

Figure 2 is a top plan view of the magnetic power unit of Figure 1, omitting the keeper and vessel shown in Figure 1.

Figure 3 is an enlarged section on the line 3—3 of Figure 2, the rotor being shown in elevation, and one of the magnets being partially broken away.

Figure 4 is an enlarged fragmentary section corresponding to Figure 3 in which the rotor is sectioned on the line 4—4 of Figure 5.

Figure 5 is a section of Figure 4 on the line 5—5.

Figure 6 is a detail elevation of the rotor alone, without the shaft and nut, illustrating the curvature on the outside of the magnets.

Describing in illustration but not in limitation and referring to the drawings:

The present invention is designed particularly to improve magnetic power units in which rotating permanent magnets are used, as shown for example in Jerome L. Murray U. S. patent application Serial No. 771,176, filed August 29, 1947, for Mixer and Processor for Home Use and the Like. The permanent magnets drive a wide variety of household appliances such as mixers, stirrers, juicers, and auxiliary household and kitchen equipment such as knife sharpeners and a variety of small tools. The permanent magnets previously required are both heavy and expensive. In accordance with the present invention, the field intensity at the keeper from a given weight of permanent magnets is increased and the efficiency of use of permanent magnet material is also correspondingly increased. The cost of the permanent magnets is reduced by simplifying their construction and reducing the required size.

In accordance with the invention, the permanent magnets do not themselves form a U, but are mounted in the direction of the axis at diametrically spaced points on the rotor and cross connected at the base by magnetically susceptible material, preferably soft steel.

The magnetically susceptible material is desirably in the form of a disc as it has been found that this construction creates a more favorable field distribution at the keeper, and at the same time provides a reference plane for dynamic balancing of the rotor.

Balancing is further assisted by providing a non-ferrous or other non-magnetically susceptible disc axially removed from the base of the rotor and desirably adjoining the pole pieces, provided with recesses for receiving one or more balancing weights.

The magnetic power unit 20 provides a top support 21 on which a vessel 22, suitably a tumbler, as shown, rests, carrying a magnetically susceptible keeper 23 which turns due to the rotating field of the magnetic power unit. Any suitable keeper and any suitable type of vessel may be employed, the illustration shown being that of mixing a liquid, but it being understood that the power unit may be used for any other suitable purpose.

The power unit comprises a base housing 24 resting on legs 25 and a top housing 26 connected thereto by screws 27 and comprising non-magnetically susceptible material such as austenitic stainless steel.

An electric motor 28 is mounted in the base housing 24 with its axis vertical, and drives a shaft 30 turning in bearings 31 and carrying at its upper end a pinion 32 which meshes with internal speed reduction gear 33 on a rotor shaft 34. The rotor shaft turns in a bottom bearing 35 in the base housing 24 and a top bearing 36 in the top housing 26.

The electric motor 28 is controlled by a switch 37 and desirably shut off by a limit switch 38 when the rotor is in its lowermost position. These features form no part of the present invention.

The rotor shaft 34 is threaded at 40 and makes threaded engagement with a nut 41 which tends to move upwardly on the shaft when the motor turns in its normal driving direction. Upward motion is limited by a collar 42 secured on the shaft and engaged by the nut in upper position.

At the lower end the nut is shouldered at 43 and receives a magnetically susceptible rotor base disc 44. The disc 44 is not a permanent magnet but is made for example of soft steel such as A. I. S. I. 1010, 1020 or 1035. The base 44 is preferably free to turn with respect to the nut but is held in place and frictionally dragged in turning by a friction shock absorber 45 secured both to the nut and the base and tending to prevent relative rotation. The shock absorber is the subject matter of my copending application Serial No. 118,306, filed September 28, 1949, for Magnetic Power Unit Shock Absorber.

The rotor includes suitably identical bar permanent magnets 46 upstanding from the base parellel to the axis of the shaft 34 secured to the base by screws 47. Any suitable permanent magnetic alloy may be used, such as aluminum 10%, nickel 17%, cobalt 12.5%, copper 6%, balance iron. As shown, each bar magnet 46 has an arcuate outside side 48, a long parallel side 50 and short parallel side 51 and a transverse inner side 52 at right angles to the parallel sides and opposite to the arcuate side. Since the two magnets are set at the same distance from the axis the curved sides 48 describe the same circle in rotation and as shown conform in curvature to this circle. The long parallel sides of the opposite magnets are lined up parallel to a diameter 53 of the rotor which extends in a position equidistant from the corresponding long sides of each magnet. This has been found to be the most advantageous orientation of the trailing edge, since the rotor moves in the direction of the arrow 54 of Figure 5 and the keeper tends to assume the position 55 with its adjoining edge cooperating with the trailing edge. It has been found, therefore, that this arrangement of the magnets slightly displaced from the diameter but with the adjoining trailing edge parallel thereto, gives most effective pull of the keeper.

At the upper end each magnet is reduced in section as compared to the section near the base by tapered surfaces 56, producing flat end pole pieces 57 which have generally the same contours as the sides of the magnet but are of reduced section. The pole pieces tend to concentrate the flux and produce more effective driving of the keeper. Thus the pole piece trailing edge 50' of each magnet is parellel to the corresponding side 50 of each magnet. Both pole faces are in the same plane transverse to the axis.

It will be understood that the use of a disc for the base 44 permits adequate cross section for magnetic flux flow purposes without the necessity of undue thickness which would tend to increase the height of the rotor.

It has been found also that the distribution of the flux beyond the pole pieces for the purpose of moving the keeper is more satisfactory when the base is a disc than when a mere bar or strap is employed.

It will be evident that the base 44 aids in completing the magnetic circuit between the two bar magnets, at the same time that it provides structural support for the magnets.

To assist in dynamic balancing and also in static balancing of the rotor, a balancing disc 58 is provided at the top of the rotor slightly below the level of the pole pieces. The balancing disc may suitably be made of non-ferrous metal such as aluminum sheet. It is placed as far removed axially as possible from the base but below the pole pieces so that weights placed on the balancing disc 58 will have maximum effectiveness in changing the balance of the rotor since the lever arm will be at a maximum. For this purpose one of the faces of the base 44 therefore functions as a balancing plane.

The balancing disc is supported in any suitable manner as by preferably non-ferrous studs 60 secured to the base, and by openings 61 which span the pole pieces and tend to anchor the balancing disc by the magnets.

Openings 62 around the circumference of the balancing disc are provided to receive a balancing weight at a selected point. A weight 63 is shown in one of the openings, suitably consisting of a slug of lead deformed or riveted into position. It will be understood that in accordance with well known principles the rotor may be designed to provide a slight amount of deliberate unbalance located at a point which can be compensated for readily by the weight 63 in one of the openings 62.

In operation, the rotor will be constructed and assembled as described. Before it is placed in the magnetic power unit it will be dynamically and statically balanced on a suitable balancing machine, and a weight inserted in one of the openings 62 as required.

The rotor will then be assembled in the magnetic power unit. In the form shown, the rotor will rest at a lower or remote position when the device is inactive and will be moved by the threads on the shaft 34 cooperating with the nut 41 to an upper or close coupling position when the device is operated. In the close coupling position, flux from the permanent magnets flowing through the magnetically susceptible base of the rotor will pass out the pole pieces to the keeper. The position of the pole piece edges with the trailing edges 50' parallel to the radius 53 which is equidistant from the trailing edges of both magnets is a particularly advantageous one, assuring a maximum of force on the keeper for a minimum of weight in the magnets. The placement of the magnets at the extreme outer edge of the rotor with the curved edges 48 on a line with a limit of the outside of the rotor gives maximum lever arm in pulling the keeper.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the spirit and scope of my claims.

Having thus described my invention what I claim as new and desire to secure by Letters Patent is:

1. In a magnetic power unit, a magnetically susceptible base adapted to turn about an axis and a plurality of permanent magnets mounted on the base at the same radius, each of the magnets having an arcuate outer first side conforming to the circle traversed by the magnets when they turn about the axis, each having a corresponding second side which faces toward and is parallel to a diameter, each having a third side opposite to the second side which is generally parallel thereto and each having an interior fourth side which is transverse to the second and third sides, the magnets at the ends remote from the base tapering to pole faces of restricted contour in the same transverse plane having edges conforming generally to the corresponding sides of the magnet.

2. In a magnetic power unit, a magnetically susceptible base of disc form adapted to turn about an axis transverse to the base and a plurality of permanent magnets mounted on the base at the same radius from the axis and extending from the same side of the base in a direction parallel to the axis, each of the magnets having a first arcuate outer side conforming to the circle traversed by the magnets when they turn about the axis, each having a second corresponding side which is parallel to the same diameter of the base, the respective magnets being on opposite sides of the diameter and spaced therefrom, each of the magnets having a third side opposite to the second side which is generally parallel to the second side, each of the magnets having a fourth interior side which is transverse to the second and the third sides, and each of the magnets having an end which lies in the same plane transverse to the axis.

3. In a magnetic power unit, a rotor comprising a massive magnetically susceptible disc shaped base, permanent magnets extending transversely from the base in the same direction at the same radius with respect to an axis of the base, the permanent magnets being symmetrical to one another, a sheet metal non-magnetically susceptible disc secured to the rotor at a position axially removed from the base toward the ends of the magnets having openings circumferentially around the sheet metal disc and a balancing weight in one of the openings.

WILLARD L. MORRISON, Jr.

REFERENCES CITED

The following references are of record in the file of this patent:

UNITED STATES PATENTS

| Number | Name | Date |
| --- | --- | --- |
| 920,898 | Abtmeyer | May 11, 1909 |
| 1,379,334 | Dean | May 24, 1921 |
| 1,853,779 | Reis | Apr. 12, 1932 |
| 1,960,790 | Muffly | May 29, 1934 |
| 2,429,114 | Whitted | Oct. 14, 1947 |
| 2,436,939 | Schug | Mar. 2, 1948 |
| 2,437,871 | Wood | Mar. 16, 1948 |
| 2,444,797 | Williams | July 6, 1948 |
| 2,556,004 | Sachse | June 5, 1951 |

FOREIGN PATENTS

| Number | Country | Date |
| --- | --- | --- |
| 288,232 | Great Britain | Jan. 17, 1929 |
| 132,422 | Switzerland | June 17, 1929 |